United States Patent [19]

Hicks

[11] Patent Number: 4,850,845

[45] Date of Patent: Jul. 25, 1989

[54] APPARATUS FOR DEPOSITING VISCOUS MATERIAL ONTO A CONVEYOR

[76] Inventor: Kevin J. Hicks, P.O. Box 93, Hornsby, New South Wales, Australia, 2077

[21] Appl. No.: 183,605

[22] Filed: Apr. 19, 1988

Related U.S. Application Data

[63] Continuation of Ser. No. 840,316, Mar. 14, 1986, abandoned.

[51] Int. Cl.[4] ............................................. A21C 11/10
[52] U.S. Cl. .................................. 425/289; 425/296; 425/311; 425/313; 425/310; 426/518
[58] Field of Search .................. 83/198, 623; 425/289, 425/295, 296, 298, 306, 307, 308, 311, 313, 314, 316, 310; 426/503, 518

[56] References Cited

U.S. PATENT DOCUMENTS

| | | | |
|---|---|---|---|
| 2,728,391 | 12/1955 | Peddinghaus et al. | 83/198 |
| 3,106,173 | 11/1960 | Harris et al. | 83/198 |
| 3,161,157 | 12/1964 | Fries | 425/311 |
| 3,217,072 | 11/1965 | Schaich | 425/308 |
| 3,611,951 | 10/1971 | Sloan | 425/313 |
| 3,887,315 | 6/1975 | Phillips | 425/311 |
| 4,004,129 | 1/1977 | Hicks | 99/386 |
| 4,274,551 | 6/1981 | Hicks | 221/78 |
| 4,517,447 | 5/1985 | Hicks | 432/128 |

Primary Examiner—Jay H. Woo
Assistant Examiner—C. Scott Bushey
Attorney, Agent, or Firm—Ladas & Parry

[57] ABSTRACT

An apparatus for depositing a viscous food mix onto a conveyor which carries the deposits of the food mix through an oven. The apparatus includes a hopper into which the food mix is loaded and an array of dies at the underside of the hopper. Counter-rotating rollers are located within the hopper and they are driven at periodic intervals to force a predetermined quantity of the food mix to be extruded downwardly through the dies at the periodic intervals. A shearing mechanism, which includes two reciprocating blades which are mounted in overlapping relationship, is located at the underside of each die for severing the extruded mix from that remaining in the die. The two blades associated with each die are formed with apertures, the blades being driven in such a manner that the apertures align when the blades are located in a first position and move out of alignment when the blades are driven to move into a second position.

5 Claims, 4 Drawing Sheets

APPARATUS FOR DEPOSITING VISCOUS MATERIAL ONTO A CONVEYOR

This is a continuation of co-pending application Ser. No. 840,316 filed on Mar. 14, 1986, abandoned.

FIELD OF THE INVENTION

This invention relates to an apparatus for depositing measured quantities of viscous material onto a conveyor.

The invention has particular application within the food processing industry for depositing food mix onto a conveyor which transports deposits of the mix through a baking oven, and the invention is hereinafter described in such context. However, it will be understood that the invention does have broader application in the food processing industry, for example in depositing viscous material onto a conveyor which transports the material through a refrigerating chamber.

BACKGROUND OF THE INVENTION

In a typical baking process applicable to cakes, biscuits, or cookies, a pre-blended dough or mix is loaded into a hopper and is extruded through a transverse array of dies at the underside of the hopper. The hopper houses a pair of counter-rotating rollers which are rotated at periodic intervals, whereby the mix is forced simultaneously through each of the dies. During each operating cycle, when a predetermined amount of mix has been extruded through the dies, a reciprocating wire cutter severs the extruded mix from that remaining in the dies. The severed portions (i.e., deposits) of the mix then fall onto a conveyor which passes below the dies and the conveyor transports the deposits, arrayed in rows and columns, through a baking oven. The conveyor typically comprises a series of baking trays which extend transversely between and are carried by two parallel endless conveyor chains.

The above described process yields more-or-less acceptable results when the food mix has a smooth dough-like consistency. However, when the mix contains additives in the form of fruit, nuts, bran, shredded coconut or the like, it has been found that the wire cutter does not make a clean cut through the extruded material. This results in the formation of non-uniform deposits on the conveyor and, because some of the deposits tend to stick to the wire cutter or resist its cutting action, the deposits in a given row may be randomly staggered across the width of the conveyor. This creates problems at the product removal station, after the deposits have passed through the baking oven, and it may even result in some of the mix deposits falling through the gap between adjacent trays.

In an alternative deposition process, a number of pistons is employed in lieu of the reciprocating wire cutter for pushing quantities of the food mix through an array of dies and in a direction toward a conveyor. However, this process does not solve the above problem because the mix tends to stick to the underside of the pistons and, with different constituents in the mix at the underside of the respective pistons, the deposits drop onto the conveyor at different time intervals. Therefore, here gain, the deposits forming a given row across the conveyor may be randomly staggered.

SUMMARY OF PRESENT INVENTION

The present invention seeks to avoid the above problems by providing a method of depositing measured quantities of food mix onto a conveyor by extruding a predetermined quantity of the mix downwardly from a retainer through a die and shearing a downwardly projecting portion of the extruded mix by use of a twin-blade shearing mechanism. When sheared from that which remains in the die, the extruded portion of the mix falls downwardly onto the conveyor.

By shearing the mix with a twin-blade mechanism, any additives in the mix are subjected to the active and reactive cutting forces of the two blades and the additives are positively cut. This is to be contrasted with the action of a wire cutter which tends to push additives aside and cut only the dough-like carrier.

The invention also provides an apparatus for depositing measured quantities of food mix onto a conveyor. The apparatus comprises a retainer into which the food mix is loaded, means for extruding a predetermined quantity of the food mix downwardly through a die, and a twin-blade shearing mechanism for shearing the extruded mix.

PREFERRED FEATURES OF THE INVENTION

The twin-blade shearing mechanism preferably comprises two overlapping blades, each of which is formed with an aperture which is dimensioned to pass the extruded mix from the die. During the extrusion process, the blades are positioned such that the apertures align to allow passage of the extruded mix. However, when a predetermined quantity of the mix has been extruded through the die, the blades are moved relative to one another so that the apertures are moved out of alignment and the extruded portion of the mix is thereby severed.

The hole in each blade may be circular but it preferably is polygonal. Also, the blades preferably are moved in a direction such that they are subjected to a (small) tensile loading during the shearing operation.

The retainer into which the food mix is loaded would normally comprise a hopper and an array of dies would normally be located at the underside of a single hopper In such a case, one shearing mechanism would normally be located below each of the dies, although a single actuating mechanism may be employed for driving all of the shearing mechanisms in synchronism.

The invention will be more fully understood from the following description of an apparatus which is suitable for use in depositing cookie mix onto conveyor trays which are intended to carry the mix into and through a baking oven. The description is provied with reference to the accompanying drawings.

DETAILED DESCRIPTION OF THE INVENTION

Figure 1:
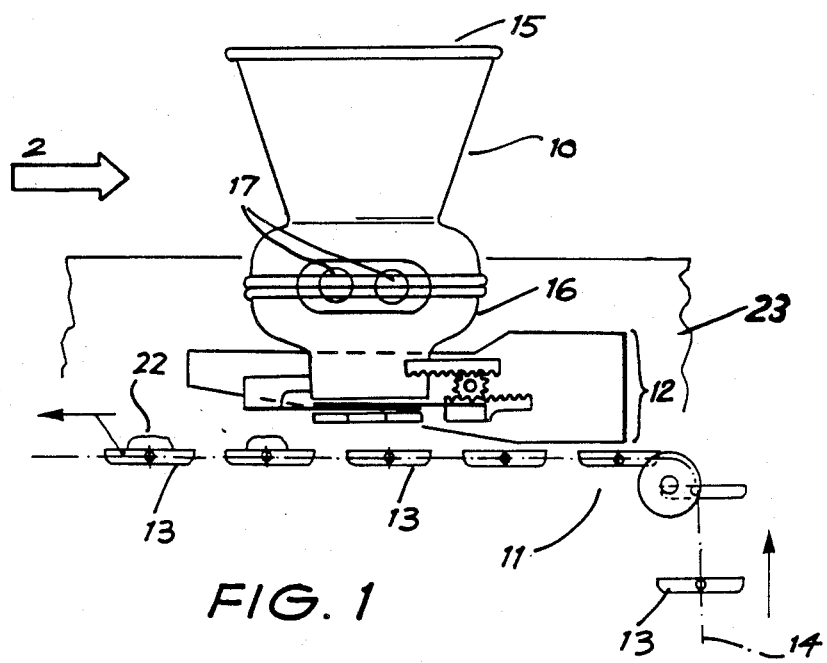
FIG. 1 shows a side elevation view of a hopper and an associated depositing mechanism located above a baking tray conveyor system.
Figure 2:
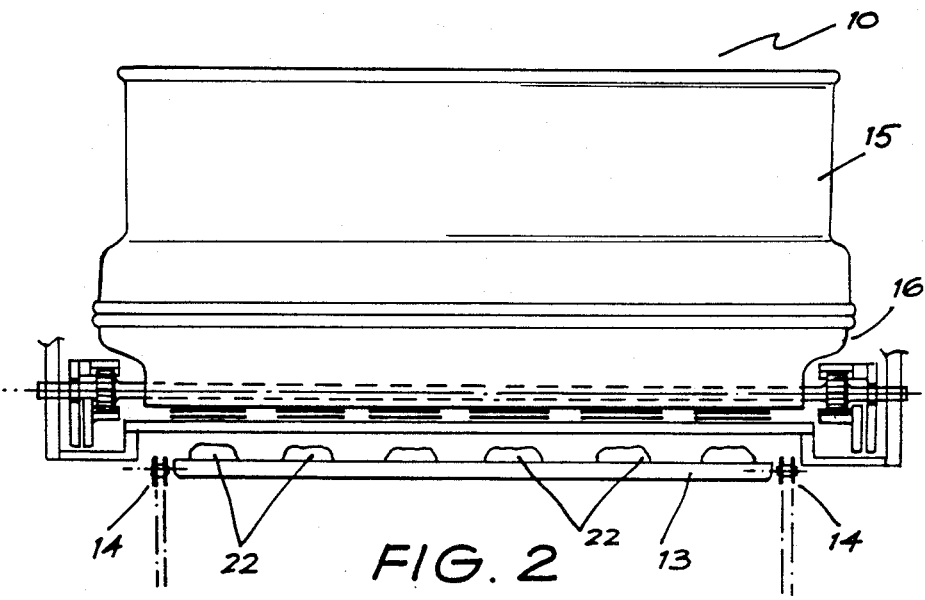
FIG. 2 shows an end elevation view of the arrangement which is illustrated in FIG. 1, as seen in the direction of arrow in FIG. 1.

As illustrated, the apparatus comprises a hopper 10, a conveyor system 11 which is driven to move past the underside of the hopper 10, and a mechanism 12 which is operated to deposit cookie mix into a conveyor system 11 from the hopper 10. The conveyor system comprises a plurality of trays 13 which are carried by a pair of spaced-apart parallel endless conveyor chains 14, and the conveyor system is driven continuously to move into and through an oven chamber (not shown). Metered quantities of the cookie mix are deposited onto the successive trays 13 as they pass below the hopper/depositing mechanism, and the deposits are carried through the oven chamber where they are baked as required. After baking, the resultant cookies are removed from the trays at an unloading station, and the empty trays are carried back to the starting position shown in FIG. 1.

The hopper 10 comprises an upper portion 15 into which the cookie mix is loaded and a lower portion 16 through which the mix is progressively extruded. The lower portion 16 of the hopper houses a pair of counter-rotating rollers 17 which are turned at periodic intervals and which force the mix through each of six transversely arrayed dies 18. The dies are fitted with removable liners 19 which may be interchanged with other liners to modify the effective diameter or the cross-sectional shape of mix which is extruded through the dies. Rotation of the rollers 17 is synchronized with advancement of the conveyor 11, so that the cookie mix is extruded through the dies 18 as successive trays approach the underside of the dies.

When a predetermined quantity of the cookie mix has been extruded through each of the dies 18, shearing blades 20 and 21 which are located below each of the dies are actuated to shear the extruded mix, and the resulting severed portion (deposits) 22 of the mix fall onto the conveyor trays 13. The mechanism is arranged such that six alinged deposits of the mix fall onto each tray at the same time.

Figure 3:
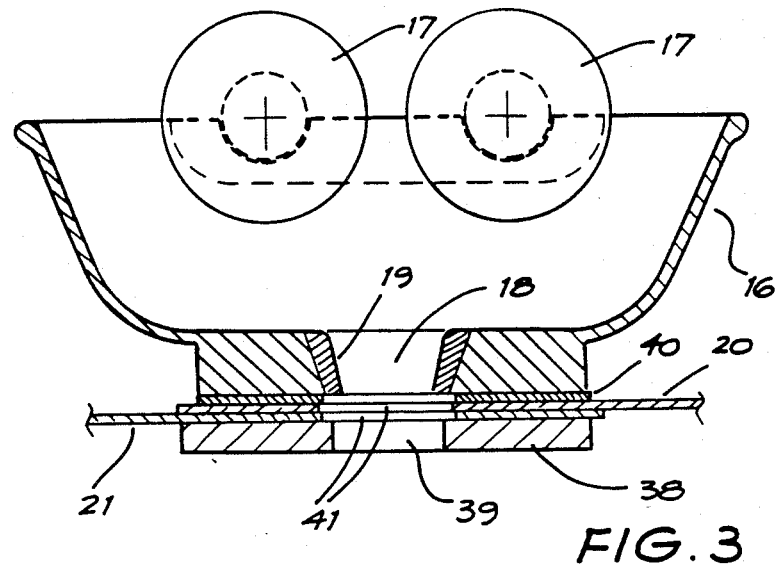
FIG. 3 shows a sectional side elevation view of a lower portion of the hopper and the depositing mechanism, with a pair of shearing blades located in a first position.
Figure 4:
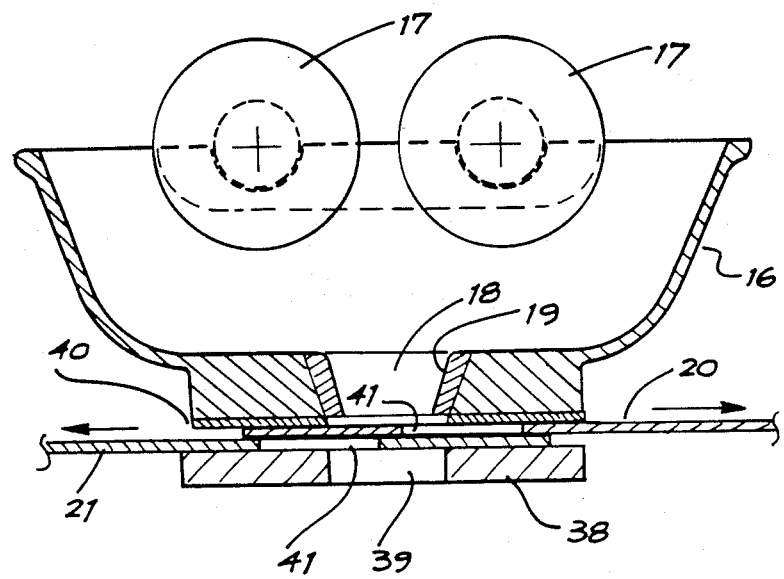
FIG. 4 shows a view which is similar to that of FIG. 3 but with the shearing blades in a second position.

FIG. 3 of the drawings shows the shearing blades 20 and 21 in a first position, and FIG. 4 shows the same blades in a second position. When the blades are in the first position the cookie mix may be extruded through the die 18 and in a direction toward the conveyor trays 13. However, when the blades are actuated into their second position, further extrusion of the cookie mix is temporarily prevented and that mix which has already been extruded through the die is severed by the blades so that it may drop onto the conveyor trays.

Figure 5:
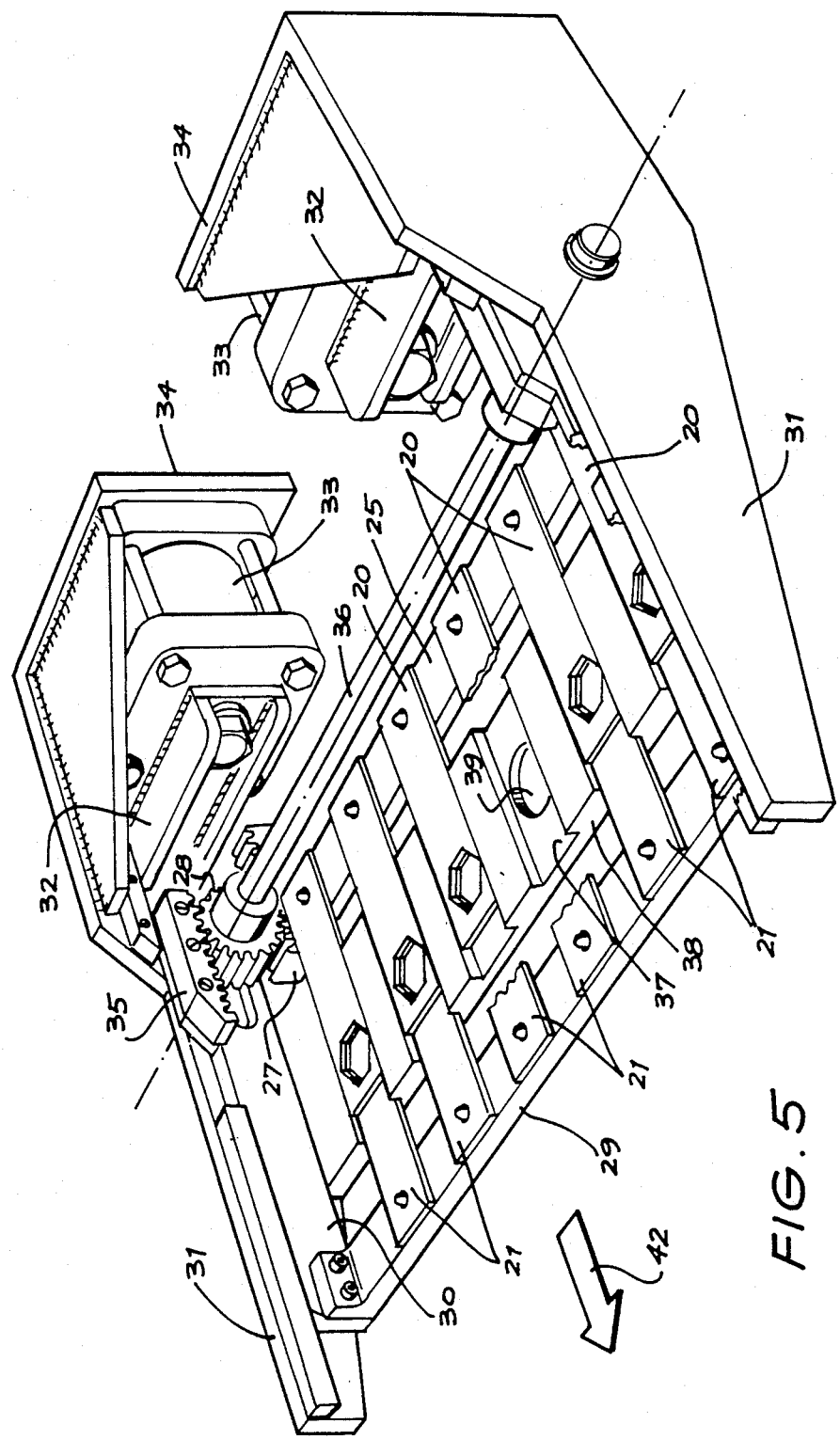
FIG. 5 shows a perspective view of the shearing blades and a drive mechanism therefor, the arrangement being removed from the remaining portion of the hopper/depositing mechanism.
Figure 6:
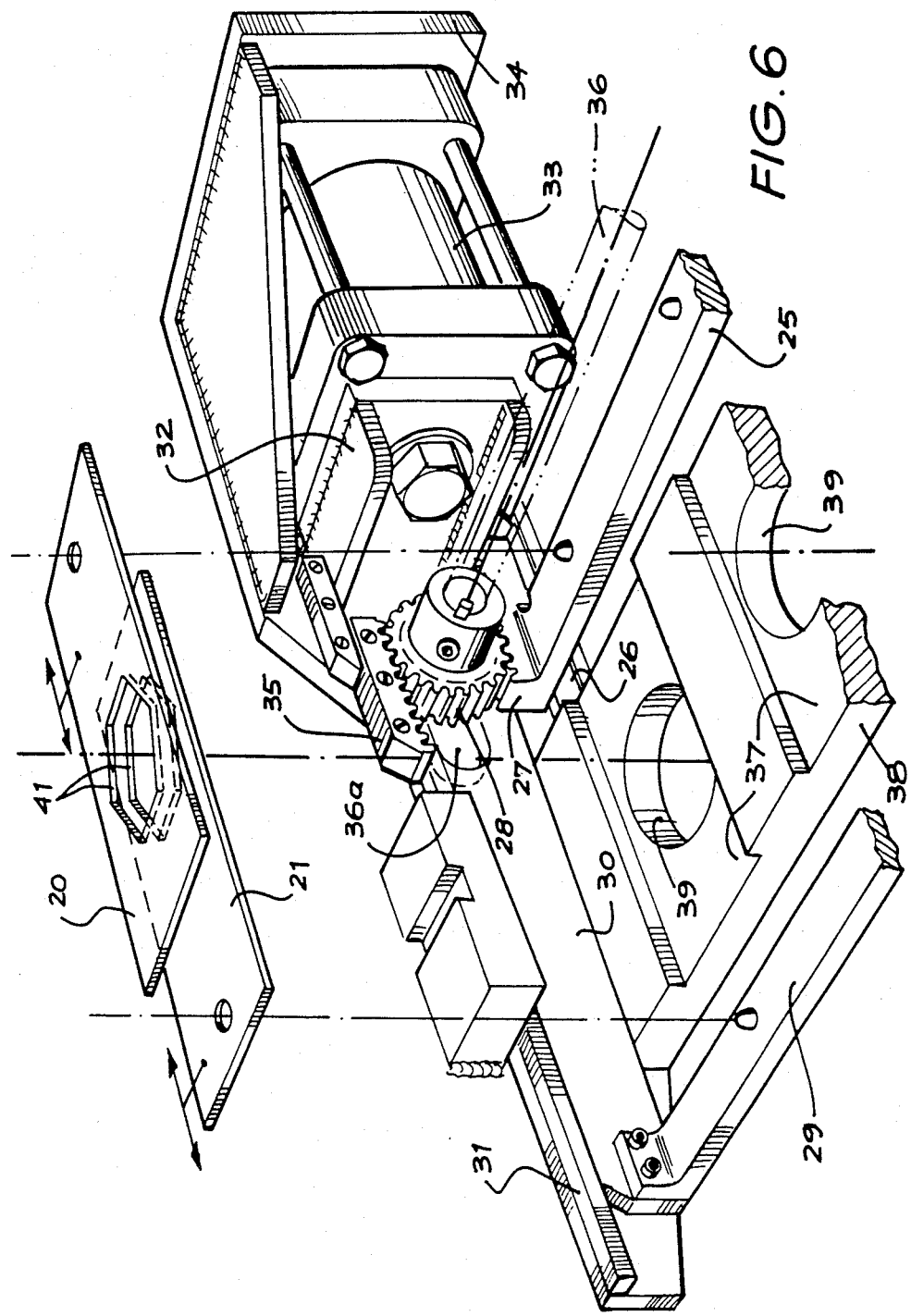
FIG. 6 shows a detailed perspective view of a portion of the arrangement which is shown in FIG. 5.

The depositing mechanism 12, including the shearing blades 20, 21 and associated actuating apparatus, is shown in greater detail in FIGS. 5 and 6. The depositing mechanism 12 is mounted directly below the lower portion 16 of the hopper, to pull it is affixed as a sub-assembled unit to the side walls 23 (FIG. 1) of a structure which houses the complete mechanism.

As shown in FIGS. 5 and 6, the shearing blades 20 are removably mounted to a first blade carrier bar 25 which is in turn supported at its opposite ends on slidss 26. Also, a driven rack 27 is mounted on each end of the blade carrier 25, each rack being engaged by a rotatable pinion 28. Rotary motion of the pinions causes linear motion to be imparted to the racks and, thus, to the blade carrier 25 and the blades 20.

The shearing blades 21 are similarly removably mounted to and pulled by a second blade carrier bar 29 which is supported at each of its ends by arms 30. The arms 30 are slidably supported by and are carried by side plates 31 which are affixed to the side walls 23 (FIG. 1) of the structure.

The arms 30 are L-shaped and the shorter leg 32 of each arm is connected to a respective double-acting pneumatic cylinder 33. The pneumatic cylinders are mounted to inwardly projecting legs 34 of the side plates 31.

A drive rack 35 is mounted to each of the arms 30 and, in operation of the mechanism, the drive racks 35 function to impart motion to the driven racks 27 by way of the pinions 28. The pinions 28 at the opposite sides of the mechanism are connected by a live axle 36, this ensuring that the blade carrier 25 always remains parallel with the blade carrier 29 during actuation of the mechanism. The axle 36 is journalled in the side plates 31 and the arm 30 are slotted at 36a to permit rectilinear movement of the arms 30 relative to the axle.

The two shearing blades 20 and 21 of each pair are mounted one above the other and the respective pairs of blades are located within grooves 37 in a guideblock 38. The guideblock 38 extends between the side plates 31 and is located in a fixed positon below the transversely arrayed dies 18. Six apertures 39 are formed within the guideblock 38, each aperture being located in one of the grooves 37 and having a diameter larger than that of the largest likely die insert 19.

The upper surface of the guideblock 38 is mounted against a sole plate 40 (FIGS. 3 and 4) of the hopper and, thus, the shearing blades 20 and 21 are constrained against all but reciprocating movement within the grooves 37.

The shearing blades 20 and 21 are formed from thin stainlees steel sheet and, as best seen from FIG. 6 of the drawings, the blades of each pair are mounted one above the other in each of the grooves 37. Each of the blades is formed with a polygonal (hexagonal) aperture 41, and when the blades are in a first position (as shown in FIGS. 3, 5 and 6), the apertures 41 in the respective blades are aligned. When the blades are moved into a second position (as shown in FIG. 4) the apertures 41 are moved out of alignment.

In operation of the apparatus, the pneumatic cylinders 33 are initially retracted to the position shown in FIGS. 5 and 6, so that the apertures 41 in each of the pair of overlapping plates are aligned. This condition is shown in FIG. 3 and, when the rolles 17 are rotated through a preselected angle, a predetermined quantity of cookie mix is extruded through the die 18, the apertures 41 and the opening 39. The quantity of mix which is extruded is determined by the degree of rotation of the rollers 17.

Immediately following extrusion of the predetermined quantity of cookie mix, the pneumatic cylinders are actuated to an extended position and this results in the arms 30 being moved to the left, in the direction indicated by arrow 42 in FIG. 5. The driving racks 35 move to the left with the arms and cause the pinions 28 to rotate in a counter-clockwise direction. This in turn causes the driven racks 27 to move to the right or, in other words, in the opposite direction to that of the driving racks 35.

Thus, the shearing blades 21 and 22 are caused to move in mutually opposite directions to the position shown in FIG. 4. The apertures 41 in the blades are caused to move out of alignment and the mix which previously was extruded through the apertures is sheared by the blades. The severed portion of the mix then falls from below the blades to deposit on the trays 13 of the conveyor, to be carried into the oven.

An important feature of the invention is that, although the forces will normally be quite small, any resistance to movement of the blades during the cutting stroke will cause a tensile load (rather than a compressive load) to be induced in the blades.

When the shearing operation is complete, the pneumatic cylinder is again actuated to a retracted position and the mechanism is restored to the condition shown in FIG. 3 so that a further batch of cookie mix may be extruded through the dies from the hopper.

I claim:

1. An apparatus for depositing a viscous food mix onto a conveyor; the apparatus comprising:

a retainer for loading with the viscous food mix;

a conveyor for receiving deposits of the viscous food mix and for conveying same away from the apparatus;

an array of dies extending in a direction transverse to the direction of movement of the conveyor, the array of dies being located between the underside of the retainer and the conveyor for receiving the viscous food mix from the retainer and directing successive corresponding arrays of deposits of the viscous food mix onto the conveyor in lines which extend transversely of the conveyor, and each die in the array being fitted with an interchangeable liner whereby the size and cross-sectional shape of the deposits may be varied in accordance with the size and shape of the liners;

extruding means for periodically extruding a predetermined quantity of the viscous food mix downwardly from the retainer and into and through the dies; and a plurality of shearing means respectively at the underside of the dies for severing from the viscous food mix received by the dies the deposits of food mix that are extruded through the dies, each shearing means comprising two thin overlapping blades which are carried by a groove in a fixed guide block which is located below the array of dies and which are slidable longitudinally in the direction of movement of the conveyor between first and second positions, each blade being formed with an aperture which has a polygonal circumference and which is sized to pass without interference the deposits of the viscous food mix when the apertures in the overlapping blades are aligned; and drive means for driving the two overlapping blades of each shearing means such that they move linearly in mutually opposite directions between the first position in which the apertures are aligned and the second position in which the apertures are moved completely out of alignment to effect severing of the viscous food mix, the two blades of each shearing means being coupled to the drive means in a manner such that, when being moved from the first to the second position, a pulling force is applied to both of the blades in order that a tensile loading will be applied to the blades in the event that anything within the viscous food mix tends to impede their movement.

2. The apparatus as claimed in claim 1 wherein the aperture in each blade has a hexagonal circumference.

3. The apparatus as claimed in claim 1 wherein the shearing means are all driven by a common drive means.

4. The apparatus as claimed in claim 1 wherein the drive means has first and second carrier bars respectively for pulling one of the blades associated with each of the shearing means and the other blade associated with each of the shearing means.

5. The apparatus as claimed in claim 4 wherein the first carrier bar is driven to move back and forth by a double acting fluid actuated cylinder and wherein the second carrier bar is coupled to the first carrier bar in a manner such that it is driven to move in mutually opposite directions to that of the first carrier bar.

* * * * *